United States Patent [19]

Roga

[11] Patent Number: 4,822,669
[45] Date of Patent: Apr. 18, 1989

[54] ABSORBENT FLOOR MAT

[75] Inventor: Robert C. Roga, Spotswood, N.J.

[73] Assignee: Colgate-Palmolive Company, Piscataway, N.J.

[21] Appl. No.: 88,168

[22] Filed: Aug. 21, 1987

[51] Int. Cl.⁴ .............................................. B32B 27/34
[52] U.S. Cl. ..................................... 428/287; 15/215; 428/284; 428/423.1; 428/905; 428/913
[58] Field of Search ............ 428/284, 286, 287, 319.7, 428/913, 423.1, 905; 15/215

[56] References Cited

U.S. PATENT DOCUMENTS

| | | | |
|---|---|---|---|
| 2,793,149 | 5/1957 | Richter | 154/49 |
| 2,843,868 | 7/1958 | Borgstram | 15/215 |
| 3,142,855 | 8/1964 | Gilchrist | 15/210 |
| 3,276,157 | 7/1965 | Griffin | 40/129 |
| 3,278,967 | 3/1963 | Hagerman | 15/215 |
| 3,377,643 | 4/1968 | Teng et al. | 15/118 |
| 3,400,421 | 9/1968 | Nappi et al. | 15/215 |
| 3,517,407 | 6/1970 | Wyant | 15/215 |
| 3,638,270 | 2/1972 | Schlegel, Jr. et al. | 15/114 |
| 3,669,454 | 6/1972 | Kolonel | 273/176 F |
| 3,736,216 | 5/1973 | Hermann et al. | 161/62 |
| 3,785,102 | 1/1974 | Amos | 52/173 |
| 3,856,610 | 12/1974 | Bruneel | 161/43 |
| 4,143,194 | 3/1979 | Wihkane | 428/81 |
| 4,162,344 | 7/1979 | Rones | 428/212 |
| 4,172,917 | 10/1979 | Angelle et al. | 428/287 |
| 4,199,639 | 4/1980 | Ronc | 428/296 |
| 4,308,303 | 12/1981 | Mastroianni et al. | 428/90 |
| 4,328,275 | 5/1982 | Vargo | 428/156 |
| 4,353,945 | 10/1982 | Sampson | 428/90 |
| 4,421,809 | 12/1983 | Bish et al. | 428/90 |
| 4,437,271 | 3/1984 | McAvoy | 51/400 |
| 4,439,474 | 3/1984 | Sagel | 428/90 |
| 4,482,593 | 11/1984 | Sagel et al. | 428/90 |
| 4,531,994 | 7/1985 | Holtrop et al. | 428/287 |
| 4,609,580 | 9/1986 | Rockett et al. | 428/198 |
| 4,614,679 | 9/1986 | Farrington, Jr. et al. | 428/138 |
| 4,644,592 | 2/1987 | Small | 4/583 |
| 4,695,501 | 9/1987 | Robinson | 428/287 |
| 4,729,917 | 3/1988 | Symdra et al. | 428/287 |

FOREIGN PATENT DOCUMENTS

| | | |
|---|---|---|
| 2630258 | 1/1978 | Fed. Rep. of Germany . |
| 2801636 | 7/1979 | Fed. Rep. of Germany . |
| 2903812 | 8/1980 | Fed. Rep. of Germany . |

*Primary Examiner*—James J. Bell
*Attorney, Agent, or Firm*—Richard J. Ancel; Murray M. Grill; Robert C. Sullivan

[57] ABSTRACT

A mat having a top layer of nonwoven fiber suitably bonded. A water impervious film thereinunder laminated to the first layer. A bottom layer of a polyurethane foam material having excellent nonskid bottom surface at the interface of the mat and the floor. In a second embodiment there is a paper absorbent layer interposed between the top layer and the water impervious film.

11 Claims, 2 Drawing Sheets

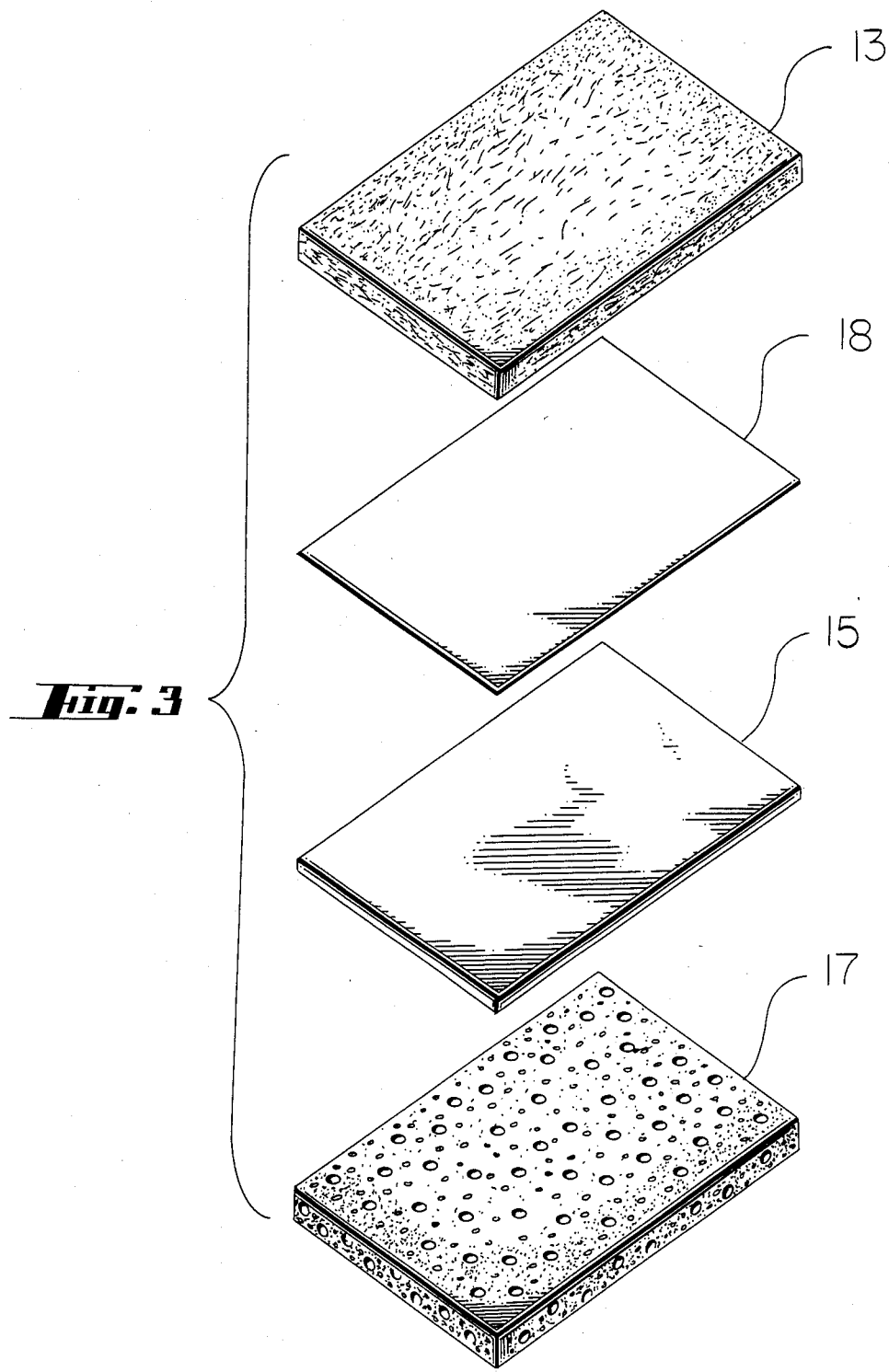

ABSORBENT FLOOR MAT

BACKGROUND OF THE INVENTION

The present invention is directed to mats useful for protecting floor surfaces from being soiled by contact with dirty liquids or other sources of dirt or contamination. Such mats are useful at entryways to buildings or in automobiles to collect soil and as protection from the elements as well as useful in hallways between factories and offices, entrances to laboratories, hospital operating rooms, industrial clean rooms and the like. Furthermore, such mats will be useful in association with likely spill areas such as locations for vending machines or other beverage dispensers. In particular, the present invention is directed to such mats that are highly effective and yet can be produced and marketed at a cost consistent with disposability.

Protective floor mats are well-known and have found widespread application. In general, the mats are either durable and relatively costly, which require cleaning and maintenance, or paper-like and intended to be discarded after a brief period of use. Examples of the former range from carpeting, throw rugs, and other woven or tufted fabric mats while the latter types principally are made of paper-like material such as are commonly found in new automobiles or runners used in protecting carpeting in newly constructed housing. There have, however, been investigated other structures designed for applications having somewhat more demanding requirements but where disposability or limited use require low costs. For example, U.S. Pat. No. 3,856,610 to Bruneel dated Dec. 24, 1974 describes a floor mat having an absorbent body portion which may be a woven or nonwoven fibrous fabric, fiberboard, paperboard, cotton or the like that is contained within a liquid impervious skin. The skin is perforated on the upper surface to permit liquid to pass through and into a series of aligned pores in the body member. It is alleged that liquid and small particles become entrapped in the pores and retained. U.S. Pat. No. 4,421,809 to Bish, Sagel and Trinh dated Dec. 20, 1983 describes a floor mat having a flocked surface that is bonded by means of a hydrophilic adhesive to an impermeable polymeric film. This combination may be further bonded to an absorbent secondary backing which may have an adhesive surface for improved hard floor stability. This structure may include a nonwoven primary backing in place of the film, but the film is preferred to maintain a thin structure. U.S. Pat. No. 4,143,194 to Wihksne dated Mar. 6, 1979 describes a disposable floor mat and holder combination wherein the mat may constitute tacky sheets, and the holder has means for reinforcing bevelled surfaces and may include interlocking means for combining mats to produce a larger surface. U.S. Pat. No. 4,285,075 to Nelson dated Aug. 15, 1981 is directed to a commode mat having a holder and absorbent mat. The absorbent mat may comprise a diaper-like construction with a nonwoven outer surface and film backing. However, grill work is provided as a top wear surface and is part of the holder structure. In yet another prior device, e.g. U.S. Pat. No. 4,609,580 one sees a mat that is disposable but does not possess a good inherent non-skid quality.

In spite of these teachings, there is not commercially available, as far as is known, a floor mat that is sufficiently durable for use at entryways and the like without a grill work structure and yet is sufficiently low-cost that its use may be consistent with disposability. Such a mat would avoid the high cost of woven and other relatively permanent structures and provide effective service. Furthermore, such a mat having a relatively limited life that could be used for advertising and promotional purposes is desired if available at a sufficiently low cost that it could be frequently changed. This would eliminate the need to clean and maintain such mats, thus providing the user with the conveniences of saving time and a constantly clean mat.

SUMMARY OF THE INVENTION

The present invention in a first embodiment is directed to a floor mat having an improved construction including a durable non-woven wear surface, a non-skid bottom layer, and a liquid impervious layer therein between. The combination, while capable of being produced at a relatively low cost consistent with disposability, provides a highly durable and absorbent product that can be used over an extended period compared with conventional more paper-like protective mats. The upper surface is composed of a durable, airlaid nonwoven polyester containing 25-40% polyvinyl chloride binder by weight. The purpose of this layer is to remove and retain soils. In a second embodiment, there is interposed between the wear surface and the impervious layer a paper layer. The resultant is not only absorbent for both water and oil based liquids, but has a strong tendency to retain such materials and keep them from being redistributed on subsequent contact with the wear surface.

The middle layer of the first embodiment (and the third layer of the second embodiment) is an impervious film of 2 mils polyurethane laminated to the bottom side of the upper layer. This layer prevents the passage of soils to the non-skid backing and possibily to the floor beneath. It also functions to assist in the lamination of the non-skid backing by providing more contact area.

The third layer or backing is a polyether polyurethane foam that provides a non-skid surface as it interfaces with floor surfaces like wood, vinyl, carpet, ceramic, slate and concrete. This acts as a safety measure for users of the mat by being a deterrent to accidental slippage. In the second embodiment, it has been found propitious to have another layer between the upper layer and the impervious layer which layer may be of paper or nonwoven polypropylene fibers of 0.5 to 1 mil in thickness.

BRIEF DESCRIPTION OF THE DRAWINGS

FIG. 3 is a perspective exploded view of the mat of another embodiment of the present invention.

DETAILED DESCRIPTION OF THE INVENTION

Figure 1:
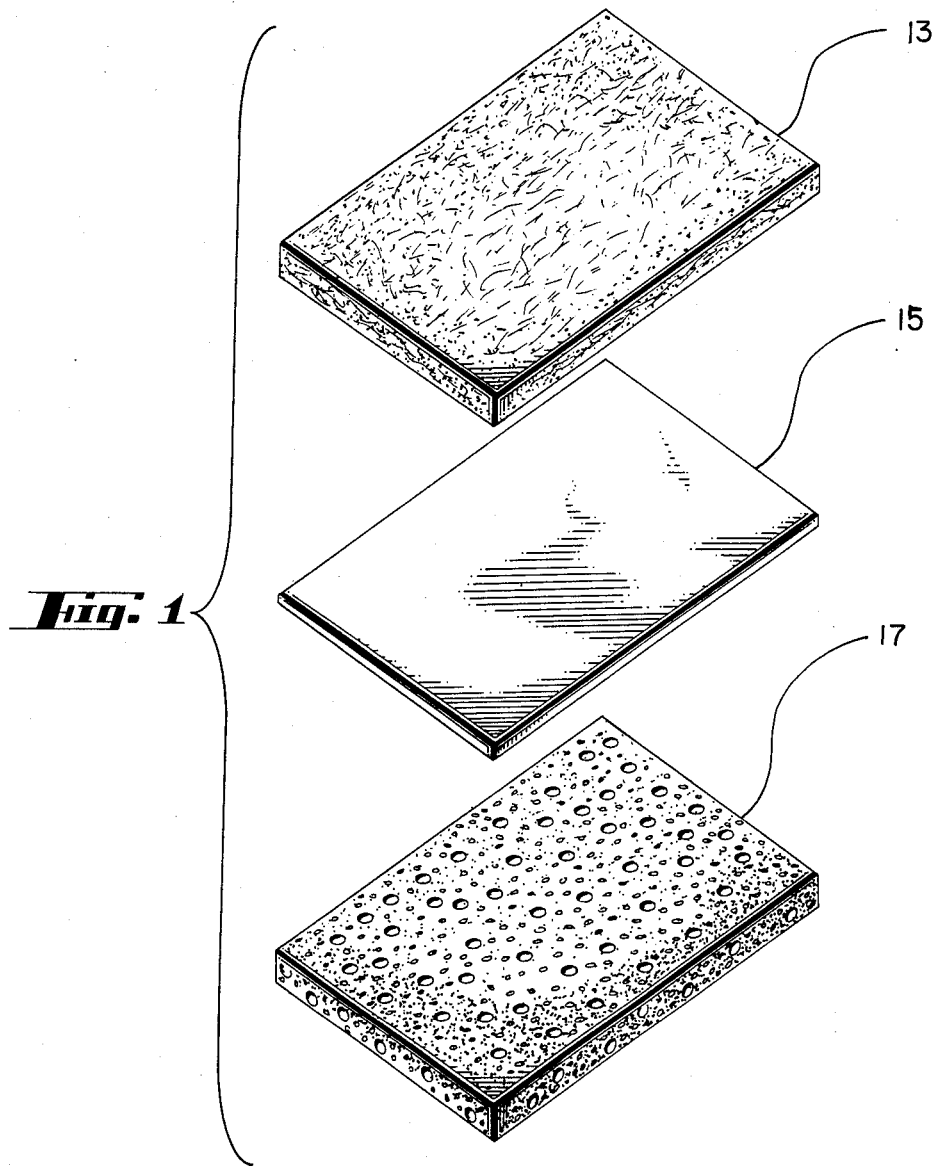
FIG. 1 is a perspective exploded view of the mat of the present invention.
Figure 2:
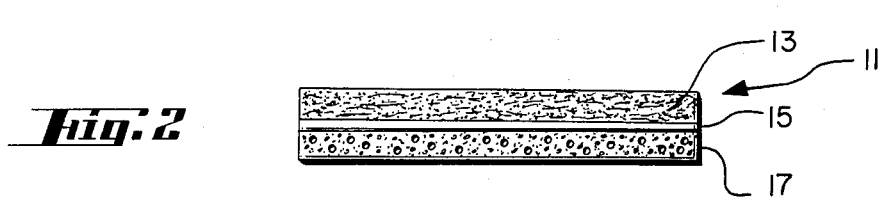
FIG. 2 is a cross-sectional view of the mat.

The mat 11 of the present invention has an upper layer 13 of a nonwoven absorbent layer of polyester which in one embodiment is manufactured by Kem-Wove, Inc. and sold under the trademark KWT-80. This layer is laminated to a film 15 polyurethane having a preferred 2 mils. This film may be also supplied by Kem-Wove Inc. The bottom layer 17 is a non-skid backing known as a SCOTFOAM polyether polyurethane or may be a polyester polyurethane.

The present invention provides an improved floor mat that is absorbent and finds applications as protection at building entryways, clean rooms, laboratories, hospitals, automobiles and the like where there is high traffic likely to bring in water, dirt, or other contaminants. The floor mat of the present invention is highly effective yet may be produced at a low cost consistent with disposability. These benefits and advantages are attained as a result of the specific structure of the mat which combines an abrasion-resistant nonwoven wear layer with an impervious intermediate layer and a bottom layer that is skid resistant.

The combination may be bonded by various means such as application of sonic energy or heat and pressure or adhesives.

In regard to different embodiments it is also contemplated the upper layer can be any naturally absorbent or chemically treated nonwoven fibrous layer such as paper, polyester, rayon or blends of rayon/polypropylene and wood pulp/polypropylene.

The said intermediate impervious layer can be a film of polyethylene, polypropylene or polyurethane ranging from 0.5 to 2.0 mils in thickness.

Finally the bottom non-skid layer can be cross-linked polyethylene, polyether polyurethane foam, polyester polyurethane foam, or a liquid polymer capable of being applied by roller or by spray. (Spray Poly, a product of Isotek Corporation is one suitable material). The bottom sheet has exceptional non-skid characteristics thereby obviating the need for retaining frames, adhesives and tapes.

It is also contemplated within the purview of the invention to include a built-in signal, i.e. a fragrance that when dissipated and no longer detectable will signal that the mat should be disposed. The fragrance can be incorporated in either or both the uppermost or bottommost layer.

Likewise an insect repellent may be incorporated into either of the said layers. Such use is particularly efficacious in the entranceways and pet areas.

In another embodiment as depicted in FIG. 3, the same layers are present as identified by the same reference numerals. However, there is interposed between upper layer 13 and the film 15 a layer 18 comprising a paper layer or a layer of non-woven polypropylene fibers. This layer finds particular efficacy in its ability to function as an absorbent. The preferred thickness is 0.5 mils to 1 mil.

Thus it is apparent that there has been provided, in accordance with the invention, an improved floor mat construction that fully satisfies the objects, aims and advantages set forth in the foregoing. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

What is claimed is:

1. An improved low cost absorbent mat comprising an upper layer of nonwoven polyester fibers, a second layer thereinunder selected from the group consisting of paper and polypropylene fibers and mixtures thereof, a third layer therebelow being an impervious thermoplastic film, said third layer being laminated to the second layer, a bottom fourth layer being a foam that provides a non-skid surface adapted and constructed to lie on the floor of a surface.

2. The mat of claim 1 wherein the foam is selected from the group consisting of polyether polyurethane and polyester polyurethane.

3. The mat of claim 1 wherein the upper layer contains a polyvinyl binder.

4. The mat of claim 3 wherein the foam is selected from the group consisting of polyether polyurethane and polyester polyurethane.

5. The mat of claim 4 wherein the foam is polyether polyurethane.

6. The mat of claim 4 wherein the foam is polyester polyurethane.

7. The mat of claim 5 wherein the film is a polyurethane and has a thickness of 2 mils.

8. The mat of claim 6 wherein the film is a polyurethane and has a thickness of 2 mils.

9. The mat of claim 7 wherein the upper layer has a polyvinyl chloride binder of about 40% by weight.

10. The mat of claim 1 wherein an insect repellent is included in the mat.

11. The mat of claim 1 wherein a fragrance is included in the mat.

* * * * *